(12) United States Patent
Vehmeijer et al.

(10) Patent No.: US 9,103,471 B2
(45) Date of Patent: Aug. 11, 2015

(54) MARINE LOAD RAISING AND LOWERING SYSTEM

(75) Inventors: Terence Willem August Vehmeijer, The Hague (NL); Ronny Lambertus Waltherus Nouwens, Schiedam (NL)

(73) Assignee: ITREC B.V., Schiedam (NL)

( * ) Notice: Subject to any disclaimer, the term of this patent is extended or adjusted under 35 U.S.C. 154(b) by 247 days.

(21) Appl. No.: 13/701,135

(22) PCT Filed: May 24, 2011

(86) PCT No.: PCT/NL2011/050351
§ 371 (c)(1),
(2), (4) Date: Feb. 7, 2013

(87) PCT Pub. No.: WO2011/152711
PCT Pub. Date: Dec. 8, 2011

(65) Prior Publication Data
US 2013/0129452 A1      May 23, 2013

(30) Foreign Application Priority Data

Jun. 2, 2010   (NL) .................................... 2004801
Mar. 22, 2011  (NL) .................................... 2006444

(51) Int. Cl.
*B66D 1/395*   (2006.01)
*B66D 1/26*    (2006.01)
(Continued)

(52) U.S. Cl.
CPC ................. *F16L 1/207* (2013.01); *B63B 27/08* (2013.01); *B63C 7/02* (2013.01); *B66C 13/18* (2013.01);
(Continued)

(58) Field of Classification Search
CPC ............ B63B 27/08; B66D 1/38; B66D 1/26; B66D 1/50; B66D 1/52; B66D 1/58; B66C 13/02; B66C 13/06

USPC ......... 254/279, 280, 281, 282, 283, 323–327, 254/334, 337, 338; 114/268
See application file for complete search history.

(56) References Cited

U.S. PATENT DOCUMENTS 3,265,360 A      8/1966  Tax
3,591,022 A  *   7/1971  Polyakov et al. .......... 414/138.3
(Continued)

FOREIGN PATENT DOCUMENTS

DE        1916644       11/1970
EP     1 850 043 A2     10/2007
(Continued)

*Primary Examiner* — Sang Kim
*Assistant Examiner* — Justin Stefanon
(74) *Attorney, Agent, or Firm* — Birch, Stewart, Kolasch & Birch, LLP

(57) ABSTRACT

The invention relates to a marine load raising and lowering system for use on a vessel, comprising: i. a first winch comprising first driving means for raising or lowering a first cable from the first winch; ii. a second winch comprising second driving means for raising or lowering a second cable from the second winch; iii. operating means connected to the first and second driving means of respectively the first and second winch for synchronising the driving means so as to perform synchronous raising or lowering of the first and second cable; iv. a load connector; wherein the first and second cable are both connected to the load connector with a respective terminal end of the first and second cable, wherein the system further comprises a first tension equalizing mechanism adapted to equalize the tension in the first and second cables, said first tension equalizing mechanism having interconnected first cable-engaging members to engage with the first and second cable, wherein said first cable-engaging members are movable relative to a first reference structure to be mounted on the vessel, and wherein said first tension equalizing mechanism is configured to move the first cable-engaging members under the effect of a difference in tension in the first and second cable so as to equalize said tensions.

20 Claims, 6 Drawing Sheets

(51) Int. Cl.
- B66D 1/58 (2006.01)
- B66C 23/52 (2006.01)
- B66C 13/06 (2006.01)
- F16L 1/20 (2006.01)
- B63B 27/08 (2006.01)
- B63C 7/02 (2006.01)
- B66C 13/18 (2006.01)
- F16L 1/12 (2006.01)

(52) U.S. Cl.
CPC . *B66C 23/52* (2013.01); *B66D 1/26* (2013.01); *B66D 1/58* (2013.01); *F16L 1/12* (2013.01); *B66C 13/06* (2013.01)

(56) References Cited

U.S. PATENT DOCUMENTS

| | | | |
|---|---|---|---|
| 4,932,541 A * | 6/1990 | Belsterling | 212/308 |
| 5,579,931 A * | 12/1996 | Zuehlke et al. | 212/276 |
| 5,951,227 A * | 9/1999 | Calkins et al. | 414/141.7 |
| 6,644,486 B2 * | 11/2003 | Jacoff et al. | 212/274 |
| 6,932,326 B1 * | 8/2005 | Krabbendam | 254/334 |
| 6,988,459 B2 * | 1/2006 | Roodenburg et al. | 114/268 |
| 7,328,811 B2 * | 2/2008 | Roodenburg et al. | 212/252 |
| 7,416,169 B2 * | 8/2008 | Noeske et al. | 254/275 |
| 7,624,882 B2 * | 12/2009 | Commandeur et al. | 212/298 |
| 2008/0105433 A1 * | 5/2008 | Christopher | 166/355 |
| 2009/0232625 A1 * | 9/2009 | Almeda et al. | 414/139.6 |
| 2010/0224844 A1 * | 9/2010 | Boussaton et al. | 254/290 |
| 2011/0253661 A1 * | 10/2011 | Smith et al. | 212/255 |

FOREIGN PATENT DOCUMENTS

| | | |
|---|---|---|
| WO | WO 2006/013053 A1 | 2/2006 |
| WO | WO 2009/002142 A1 | 12/2008 |

* cited by examiner

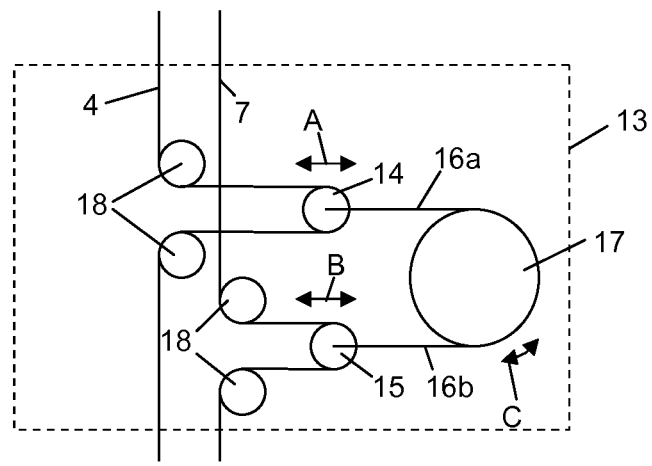
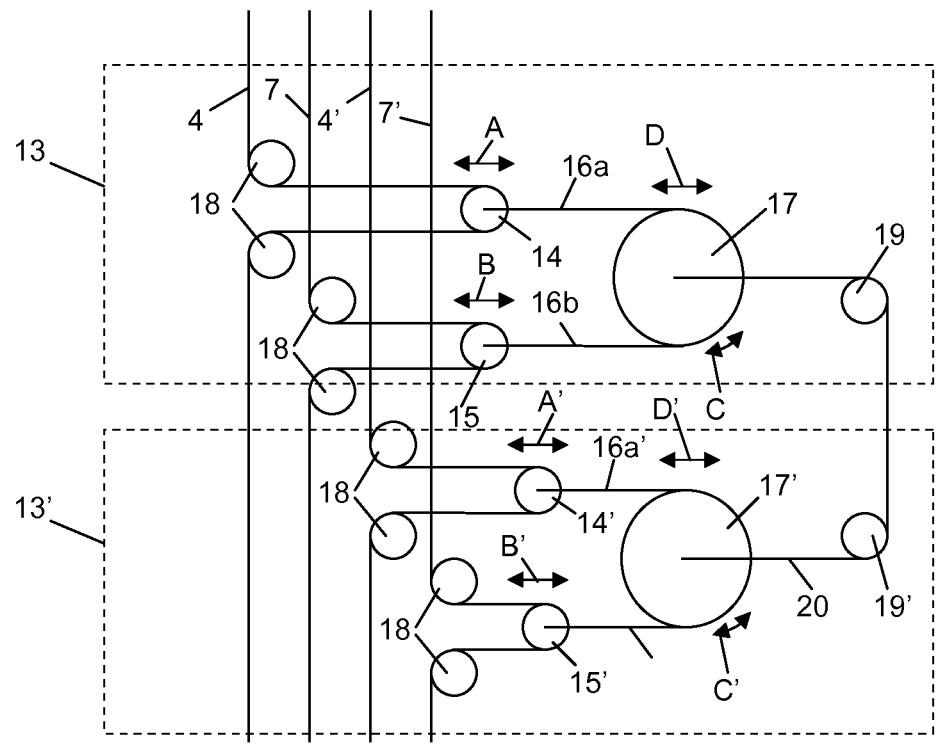

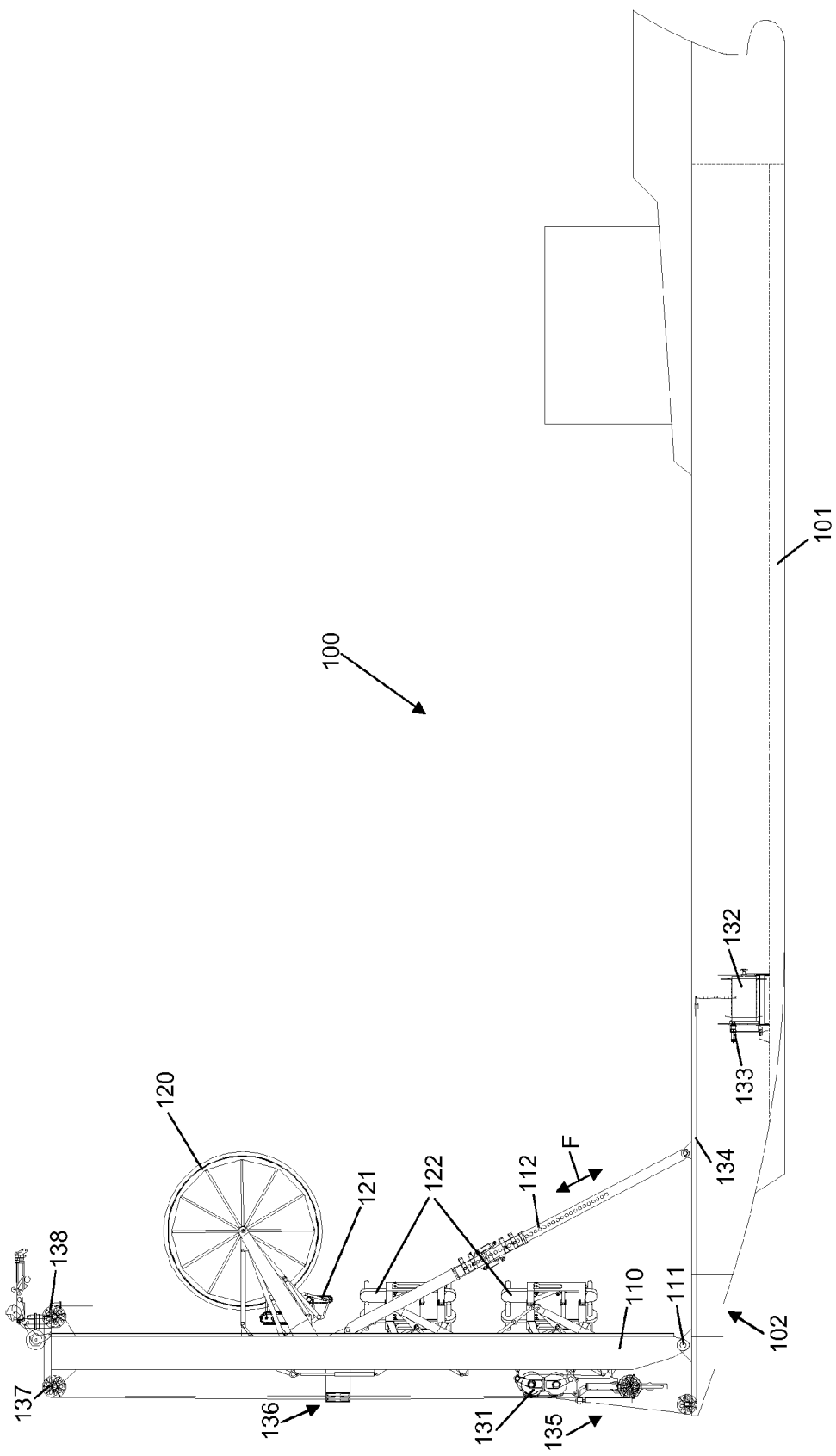

MARINE LOAD RAISING AND LOWERING SYSTEM

The invention relates to a marine load raising and lowering system for use on a vessel, preferably a vessel for laying an offshore pipeline.

Such a system is well known, for example on vessels used for laying pipelines. The system is then used in particular for abandoning and recovering a pipeline, to which system and method are referred to as an A&R system and an A&R method. During pipelaying, it is sometimes necessary to abandon a pipeline and recover it later. For example, a pipeline might need to be abandoned due to weather conditions or alternatively for the vessel to be loaded with pipeline, e.g. on a reel. Conventionally, such A&R method is carried out by connecting an A&R head to the end of the laid pipeline; connecting a cable to this head; transferring pipeline tension from a pipeline tensioning arrangement on the vessel that is used during pipelaying to a winch via the cable; and laying the pipeline and the head on the bottom of the sea by controlled lowering of the cable via driving means of the winch.

A marine load raising and lowering system may also be used to place other components on the bottom of the sea, e.g. a canister.

U.S. Pat. No. 7,182,550 discloses an A&R system and method using a single winch, cable and associated driving means for lowering and raising the laid pipeline. The use of this system in deep water, e.g. several hundred metres or even more than one kilometre causes several problems. The cable associated with the winch must have a very high tensile strength to support a heavy load. This requirement leads to a heavy cable with the result that the weight of the cable itself becomes a further factor. Thus an even higher load capacity of the winch will be required.

This problem may be solved in a known manner by providing a first winch comprising first driving means for raising or lowering a first cable portion and a second winch comprising second driving means for raising or lowering a second cable portion, see for instance the international publication WO 2009/002142 of the applicant. Operating means are provided which are connected to the first and second driving means of the first and second winch for synchronising the driving means so as to perform synchronous raising and lowering of the first and second cable portions. The first cable portion and the second cable portion are interconnected at the lower ends via a rotatable equalizing sheave. This sheave will rotate when the operation of the first and second cable portions is not fully synchronous, thereby preventing overload of the cable portions when only a small deviation of synchronicity occurs. The load connector, to which the load is or can be attached, is connected to the axle of the equalizing sheave.

A disadvantage of the system according to WO 2009/002142 is that especially for deep water purposes the load connector may rotate about a vertical oriented axis, thereby entangling the two cable portions. As the first and second cable can move relative to each other due to rotation of the equalizing sheave, the entangled cable portions may graze each other which leads to increased wear resulting in reduced lifetime and possibly breakage of the cable portions.

It is therefore an object of the invention to provide an improved load raising and lowering system, in particular a load raising and lowering system in which wear of the cable portions is reduced.

This object is achieved by providing a marine load raising and lowering system for use on a vessel, preferably a vessel for laying an offshore pipeline, which system comprises:

a first winch comprising first driving means for raising or lowering a first cable from the first winch;
a second winch comprising second driving means for raising or lowering a second cable from the second winch;
operating means connected to the first and second driving means of respectively the first and second winch for synchronising the driving means so as to perform synchronous raising or lowering of the first and second cable;
a load connector;
characterized in that the first and second cable are both connected to the load connector with a respective terminal end of the first and second cable, and in that the system further comprises a first tension equalizing mechanism adapted to equalize the tension in the first and second cables, said first tension equalizing mechanism having interconnected first cable-engaging members to engage with the first and second cable, wherein said first cable-engaging members are movable relative to a first reference structure to be mounted on the vessel, and wherein said first tension equalizing mechanism is configured to move the first cable-engaging members under the effect of a difference in tension in the first and second cable so as to equalize said tensions.

An advantage of the first tension equalizing mechanism is that the relative movement of the cable portions between the first tension equalizing mechanism and the load connector (where the entanglement will take place) is decreased, thereby reducing wear of the two cables.

Another advantage may be that the load connector is supported by at least two cables instead of one cable, thereby resulting in a more redundant system.

Yet another advantage may be that the connection of the cables to the load connector requires less space then in case of a relatively large equalizing sheave, so that the load connector is able to pass smaller openings, e.g. such as openings in tensioners, or moonpools.

In an embodiment, the first cable-engaging members comprise a first sheave to engage with the first cable and a second sheave to engage with the second cable. As the first and second sheaves are able to rotate thereby moving along with the respective first and second cable, wear between the first cable-engaging members and the first and second cable is minimized.

To minimize the occupied space of the first cable-engaging members, rotation axes of the first and second sheave may be aligned on a common axis.

In an embodiment, the system comprises one or more sheaves upstream and/or downstream of the first tension equalizing system to guide the first and second cable from and to the first cable-engaging members. The sheaves are preferably fixed to the vessel.

The sheaves ensure minimal wear of the cables when passing the sheaves due to their rotation possibilities. Another advantage of the sheaves may be that they direct a portion of the respective cables in another direction than the main portion of the cables which will have a substantially vertical orientation when not wound on the winches. Movement of the first cable-engaging members then hauls in one cable and pays out the other cable thereby allowing to equalize the tensions in said cables. As cables, and especially long cables for deepwater purposes, will also have a spring-like behaviour, equalizing the tension will only cause movement of the cables in a top portion near the first tension equalizing mechanism and minimal movement at a bottom portion near the load connector. Hence decreasing the wear of the cables due to this movement.

As the tension equalizing mechanism is only able to equalize the tensions in the cables, it is not able to protect an overload in the cables due to undesired vessel motions. Therefore, preferably a heave compensator is provided to haul in or pay out both cables at the same time to compensate for the undesired vessel motions and protect the cables from an overload.

In an embodiment, the heave compensator is provided on the first and second winch.

Alternatively, the heave compensator may be provided between the first and second winch and the tension equalizing mechanism. The heave compensator may also be integrated in the tension equalizing mechanism, for instance by providing a cylinder between the first cable-engaging members.

In an embodiment, the heave compensator is provided for one of the first or second cable only. To protect the other cable from overload, the heave compensator cooperates with the tension equalizing mechanism. In such a case, the heave compensator will haul in or pay out one of the first or second cable due to vessel motions, and the tension equalizing mechanism will ensure that the other of the first or second cable is paid out or hauled in as well. To work properly, the working range of the tension equalizing mechanism must be large enough or the winches should be controlled properly based on movement of the tension equalizing mechanism in order to limit said movement of the tension equalizing mechanism. Movement of the tension equalizing mechanism can be measured using a displacement sensor.

In an embodiment, each of the first and second winch is a traction winch cooperating with a respective storage winch driven by associated operating means which are configured to provide a hold-back force in the first and second cable for the respective traction winch. An advantage of this system is that usually the traction winch can be designed smaller (and therefore lighter) compared to the storage winch, so that for instance the traction winch can be more easily mounted to a pipelaying tower or other kind of structure, while the storage winch can be mounted in a more suitable location where space and mass is less of an issue. Mounting the traction winch on a tower or other kind of structure may reduce the moments applied by the traction winch to said tower or said other kind of structure.

Preferably, a hold-back force sensor is provided in contact with the operating means of the storage winches in order to synchronize movement of the storage winches with the respective first and second winch.

In an embodiment, a displacement sensor in contact with the operating means is provided measuring the displacement of the first cable-engaging members to correct for non-synchronous raising or lowering of the first and second cable. This makes it possible to keep the first cable-engaging members within a predetermined displacement range and thus may reduce the size of the first tension equalizing mechanism.

Preferably, in case of two cables only, the first reference structure is fixed relative to the vessel. The first reference structure can also be movable, e.g. when it is part of or connected to a heave compensator.

In an embodiment, the system comprises:
a third winch comprising third driving means for raising or lowering a third cable from the third winch;
a fourth winch comprising fourth driving means for raising or lowering a fourth cable from the fourth winch;
a second tension equalizing mechanism having interconnected second cable-engaging members to engage with the third and fourth cable,
wherein the second cable-engaging members are movable relative to a second reference structure to be mounted on the vessel, and wherein the second tension equalizing system is configured to move the second cable-engaging members under the effect of a difference in tension in the third and fourth cable so as to equalize said tensions, and wherein the third and fourth cable are each connected to the load connector with a respective terminal end of the third and fourth cable, and wherein the first and second reference structures of the first and second tension equalizing mechanisms are interconnected, said first and second reference structures being movable relative to a third reference structure to be mounted on the vessel so as to equalize the tensions in the first, second, third and fourth cable.

In this embodiment, the first and second reference structures of the first and second tension equalizing mechanism are preferably movable relative to the vessel. The third reference structure is preferably fixed to the vessel.

The first and/or second cable-engaging members are preferably interconnected using a beam or a connecting cable. In case of a connecting cable, the corresponding reference structure may be a sheave across which the connecting cable is run.

In case of a first and second tension equalizing mechanism, the corresponding reference structures are preferably interconnected using a beam or a connecting cable similar to the interconnection of the first and second cable-engaging members.

In an embodiment, the load raising and lowering system operates as an abandonment and recovery system.

The invention also relates to a method for lowering a load from a vessel, preferably a vessel 5 for laying an offshore pipeline, wherein use is made of a load raising and lowering system comprising first and second winches with respective first and second driving means for raising or lowering first and second cables from the winches, operating means connected to the first and second driving means of the first and second winch for synchronising the driving means so as to perform synchronous raising or lowering of the cables, and a first tension equalizing mechanism for equalizing tensions in the first and second cable, said first tension equalizing mechanism having interconnected first cable-engaging members to engage with the first and second cable, wherein said first cable-engaging members are movable relative to a first reference structure to be mounted on the vessel, and wherein the first tension equalizing mechanism is configured to move the first cable-engaging members under the effect of a difference in tension in the first and second cable so as to equalize said tensions, said method comprising the following steps:
connecting a respective terminal end of the cables to a load connector;
connecting a load to the load connector;
lowering the cables.

In an embodiment, the method also includes the following steps:
measuring a displacement of the first cable-engaging members;
adjusting signals provided to the driving means by the operating means based on said measured displacement of the first cable-engaging members to correct for non-synchronous lowering of the cables.

Preferably, the signals provided to the driving means by the operating means are adjusted such that the displacement of the first cable-engaging members is limited to a predetermined displacement range.

Cables mentioned in this application may each have a length of at least 500 m, preferably at least 1000 m, more preferably at least 2000 m, and most preferably at least 3000 m. The maximum capacity of the marine load raising and lowering system may be at least 200 metric tons, preferably at least 400 metric tons, more preferably at least 600 metric tons, and most preferably at least 800 metric tons.

The invention will now be described in a non-limiting way with reference to the accompanying drawings, in which like parts have like reference numerals, and in which:

FIG. 4 depicts a schematic view of a tension equalizing mechanism according to yet another embodiment of the invention;

FIG. 5 depicts a schematic view of a tension equalizing mechanism according to a further embodiment of the invention;

FIG. 6 depicts a vessel in side view provided with a marine load raising and lowering system according to another embodiment of the invention;

Figure 9:
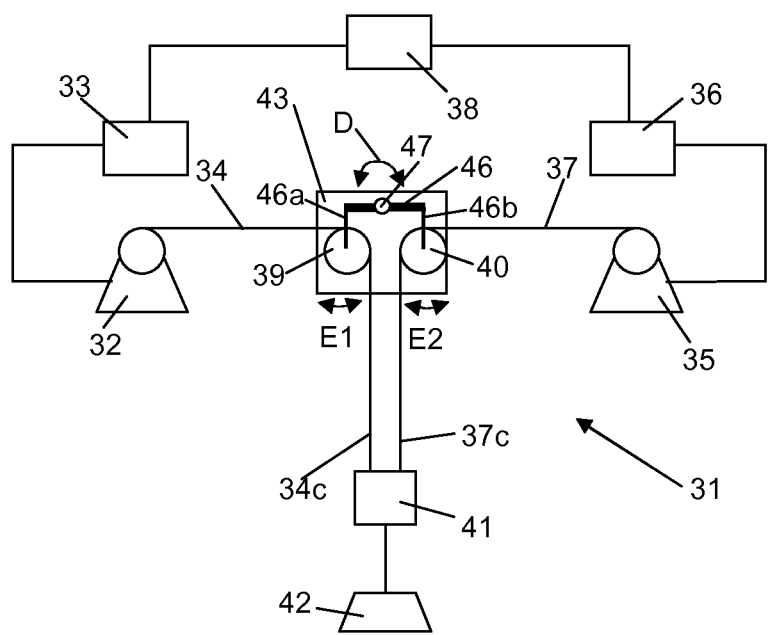
FIG. 9 depicts a schematic view of a marine load raising and lowering system according to a further embodiment of the invention.
Figure 10A:
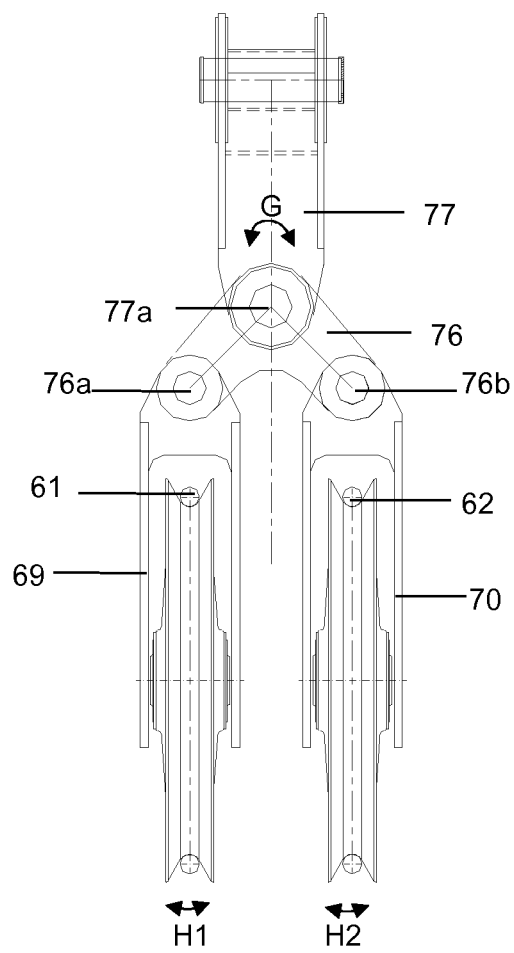

FIGS. 10a,b depict in detail a preferred embodiment of a tension equalizing mechanism according to the embodiment of FIG. 9.

Figure 1:
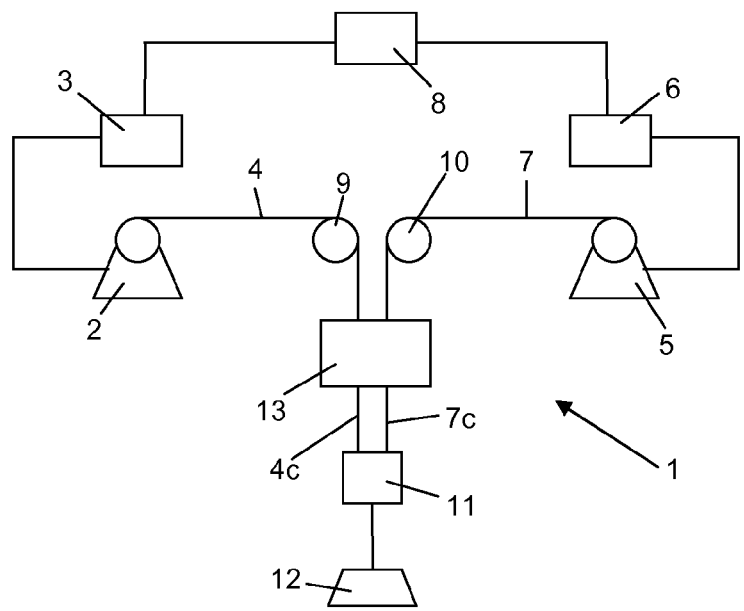
FIG. 1 depicts a schematic view of a marine load raising and lowering system according to an embodiment of the invention.

FIG. 1 depicts a marine load raising and lowering system 1 for use on a vessel, preferably a vessel for laying an offshore pipeline, which system comprises a first winch 2 with first driving means 3 for raising and lowering a first cable 4 from the first winch 2, and a second winch 5 with second driving means 6 for raising and lowering a second cable 7 from the second winch 5. The first and second driving means 3, 6 can be synchronized by operating means 8 connected to the first and second driving means so as to perform synchronous raising and lowering of the first and second cable. The operating means are in this embodiment electronic operating means.

The first and second cable 4,7 will in practice be very long, but represented here short for reasons of clarity. The first and second driving means are electronically and/or mechanically connected to the respective first and second winch 2,5. The driving means may include any type of motor. The first cable 4 is suspended via a sheave 9 from the first winch 2. Similarly the second cable 7 is suspended via a sheave 10 from the second winch 5.

The first and second cable 4,7 are connected to a load connector 11 with a respective terminal end 4c, 7c of the first and second cable 4,7. The load connector 11 is or can be coupled to a load 12. Due to this configuration, the cable portions 4c, 7c are substantially stationary with respect to each other, so that wear during entanglement of the cables (e.g. in deepwater operations) is minimized.

Between the load connector and the sheaves 9, 10, a first tension equalizing mechanism 13 is provided through which the first and second cable 4,7 pass. The first tension equalizing mechanism is not shown in detail in FIG. 1, but said system 13 comprises interconnected first cable-engaging members to engage with the first and second cable, wherein said first cable-engaging members are movable relative to a first reference structure to be mounted on the vessel, and wherein the first tension equalizing mechanism is configured to move the first cable-engaging members under the effect of differential tensions in the first and second cable so as to equalize said tensions. This ensures that the load is suspended by both the first and second cable and no overload in one of the cables occurs due to e.g. non-synchronous lowering or raising of the cables.

Figure 2:
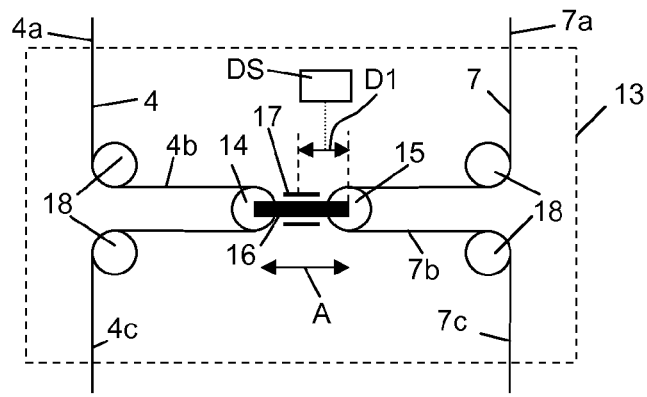
FIG. 2 depicts a schematic view of a tension equalizing mechanism according to an embodiment of the invention.
Figure 3:
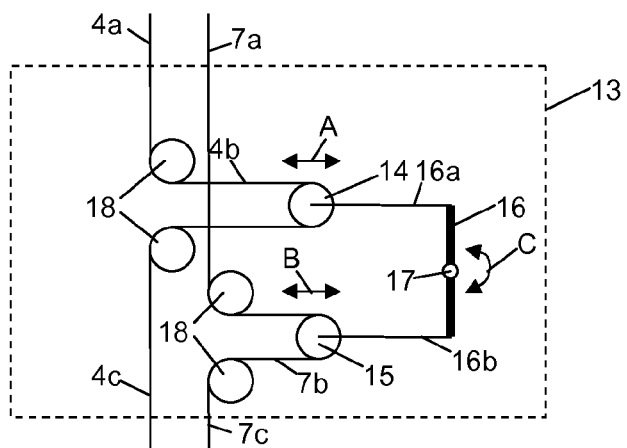
FIG. 3 depicts a schematic view of a tension equalizing mechanism according to another embodiment of the invention.

Possible embodiments of a first tension equalizing mechanism that can be used in a load raising and lowering system 1 of FIG. 1 are shown in FIGS. 2-4 and described below.

FIG. 2 schematically depicts an embodiment of a first tension equalizing mechanism 13 according to the invention. Provided to the first tension equalizing mechanism are cable portions 4a and 7a of respectively the first cable 4 and the second cable 7.

The first tension equalizing mechanism 13 comprises interconnected first cable-engaging members in the form of sheaves 14,15. The interconnection is provided by means of beam 16.

The sheaves 14,15 engage with respective cable portions 4b,7b and are movable relative to a first reference structure 17 to be mounted on a vessel. The movable direction of the sheaves 14,15 and the beam 16 is indicated by arrow A. The cable portions 4b, 7b are guided to and from the sheaves 14, 15 by sheaves 18. Preferably, the sheaves 18 and the first reference structure are fixed relative to the vessel. Cable portions 4c,7c are or can be connected to a load connector as shown in FIG. 1.

In this embodiment, the reference structure 17 acts as a guide for the beam 16.

To minimize the occupied space of the cable-engaging members and the beam 16 seen in the direction A, the sheaves 14,15 can be aligned such that their respective rotation axes substantially coincide, i.e. are aligned on a common axis. This provides a compact structure.

Due to the fact that the orientation of a significant portion of the cable portions 4b, 7b is non-parallel to the cable portions 4a,4c,7a,7c, movement of the sheaves 14,15 hauls in one of the cables 4 or 7 and pays out the other one of the cables 4 or 7. Movement of the sheaves 14,15 is effected by differential tensions in the first and second cable 4,7 which may result from non-synchronous driving of the first and second winch. The configuration of the first tension equalizing mechanism is such that movement of the sheaves 14,15 under the effect of differential tensions in the first and second cable equalizes said tensions.

If movement of the sheaves 14,15 is caused by a non-synchronous driving of the first and second winch it is very likely that the sheaves 14,15 will continue to move to one side of the first tension equalizing mechanism to constantly compensate for the non-synchronicity. As movement of the sheaves 14,15 will generally be limited, it is preferred that a displacement sensor DS in contact with the operating means is provided measuring the displacement D1 of the sheaves 14,15 relative to the first reference structure 17 to correct for non-synchronous raising or lowering of the first and second cable.

An advantage of the configuration of FIG. 2 is that the system may be designed symmetrical about a plane equidistant and parallel to both cable portions 4a,7a, said plane also being substantially parallel to the rotation axes of the sheaves 14,15,18.

FIG. 3 depicts schematically a first tension equalizing mechanism 13 according to another embodiment of the invention. The first tension equalizing mechanism comprises sheaves 18 and a first reference structure 17 which are to be mounted to a vessel. The sheaves 18 guide the respective cables 4,7 to first cable-engaging members in the form of respective sheaves 14,15. The sheaves 14,15 are both connected to a beam 16 via respective connecting means 16a, 16b. Said connecting means may be a cable, rod or the like. The beam 16 is pivotable about first reference structure 17, as indicated by arrow C, so that the sheaves 14,15 are movable in respective directions A and B. Due to this configuration, movement of sheave 14 for instance to the right occurs simultaneously, i.e. synchronously, 35 with movement of sheave 15 to the left, i.e. cable 4 is hauled in and cable 7 is paid out.

Movement of the sheaves is caused by differential tensions in the first and second cable 4,7 and will equalize said tensions.

Similar to the embodiment of FIG. 2, a displacement sensor can be provided to measure the displacement of the sheaves 14,15 to correct for non-synchronous raising and lowering of the first and second cable 4,7. This displacement sensor can be provided between the first reference structure 17 and the beam 16 to measure a rotation of said beam 16 relative to the first reference structure, or can be provided between the first reference structure and the connecting means 16a, 16b or sheaves to measure a translation of said connecting means or sheaves relative to the first reference structure. It is even possible to provide the displacement sensor between the sheaves 14,15 to measure the relative mutual position of the sheaves 14,15.

FIG. 4 depicts schematically a first tension equalizing mechanism 13 according to yet another embodiment of the invention. The first tension equalizing mechanism is similar to the system of FIG. 3. The difference between the two embodiments is that the sheaves 14,15 are interconnected via cable portions 16a, 16b that are connected to each other via a rotatable first reference structure 17 in the form of a sheave. The rotation of the first reference structure 17 is indicated by arrow 17. The sheave 17 is to be fixedly mounted to a vessel as are the sheaves 18, so that sheaves 14,15 can move in opposite directions indicated by arrows A and B and the cable portions 16a, 16b are guided by the sheave 17. An advantage of the tension equalizing mechanism of FIG. 4 over the tension equalizing mechanism of FIG. 3 may be that the moving range of the sheaves 14, 15 is larger.

FIG. 5 depicts schematically a first tension equalizing mechanism 13 and a second tension equalizing mechanism 13' for use in a marine load raising and lowering system that employs four cables 4, 4', 7, 7' and associated winches (not shown). Each cable 4, 7, 4',7' is guided by sheaves 18 to a respective sheave 14,15, 14',15'. The sheaves 14,15 are connected to cable portions 16a, 16b which are connected to each other via a rotatable sheave 17 which acts as a first reference structure. The sheave 17 guides the cable portions 16a, 16b thereby allowing movement of the sheaves 14, 15 to equalize tensions in said cables 4,7. Movement of the sheaves 14,15 is indicated by arrows A and B. Rotation of the sheave 17 is indicated by arrow C.

Similarly, the sheaves 14',15' are connected to cable portions 16a', 16b' which are connected to each other via a rotatable sheave 17' which acts as a second reference structure. The sheave 17' guides the cable portions 16a', 16b' thereby allowing movement of the sheaves 14', 15' to equalize tensions in said cables 4',7'. Movement of the sheaves 14' and 15' is indicated by arrows A' and B', and rotation of the sheave 17' is indicated by arrow C'.

The sheaves 17, 17' in turn are movable relative to a third reference structure 19,19' in the form of sheaves which are to be mounted to a vessel. Movement of the sheaves 17,17' is indicated by arrows D and D'. The sheaves 17,17' are interconnected via cable 20 that runs over the sheaves 19,19'. Due to this configuration, the tension in all four cables can be equalized and the four cables can be connected to a load connector with their respective terminal ends.

It will be apparent to a person skilled in the art that the number of cables can easily be increased by providing more tension equalizing mechanisms and interconnecting the respective movable reference structures. For instance, the system shown in FIG. 5 can be expanded to eight cables by doubling the configuration, making the respective third reference structures movable relative to a fourth reference structure and interconnect the respective third reference structures.

FIG. 6 depicts a vessel 100 for laying a pipeline on a seabed using a reel lay pipelaying method. The vessel comprises a floatable hull 101 and at the stern of the vessel a tiltable tower 110. Said tower 110 is tiltable about pivot axis 111 by actuator 112 that can be extended or shortened in a direction F.

Provided on the tower 110 are a guide wheel 120, a straightener 121 and two tensioners 122. A pipeline is unwound from a reel (not shown), run over the guide wheel 120 through the straightener and tensioners to be laid in a substantial vertical orientation, e.g. as in J-lay pipelaying. The pipeline is laid through an opening 102 in the hull 101.

Also provided on the vessel is an abandonment and recovery (A&R) system to abandon and recover a laid pipeline. The A&R system comprises a storage winch 132 and a traction winch 131. The storage winch generally comprises the main part of a cable 134. The tension required to carry a load suspended from the cable 134 is provided by the traction winch 131. In this embodiment, the traction winch 131 is provided on the tiltable tower, so that the tension generated by the traction winch does no influence tilting of the tower as much as it would if the traction winch was not provided on the tower, but directly on the hull as the storage winch. In order to synchronize movement of the traction winch and the storage winch, associated driving means and operating means 133 are provided for the storage winch that are configured to provide a hold-back force in the cable 134.

After the cable 134 passes the traction winch, the cable 134 passes a heave compensator 135, a first tension equalizing mechanism 136, and sheaves 137 and 138 at the top of the tower. By suitably driving of the traction winch, the cable 134 is able to be lowered and raised past the tensioners 122 via the moonpool 102 towards the seabed.

As the vessel is shown in side view, it is not clearly shown in FIG. 6 that a similar configuration is provided on the other side of the vessel, so that in total two cables can be lowered and raised. Also not shown is that the cables can be connected to a load connector. As the cables are connected to the load connector with a respective terminal end instead of a equalizing sheave as done in prior art systems, a slender load connector and cable connection can be provided so that it can easily pass the tensioners 122.

Figure 7:
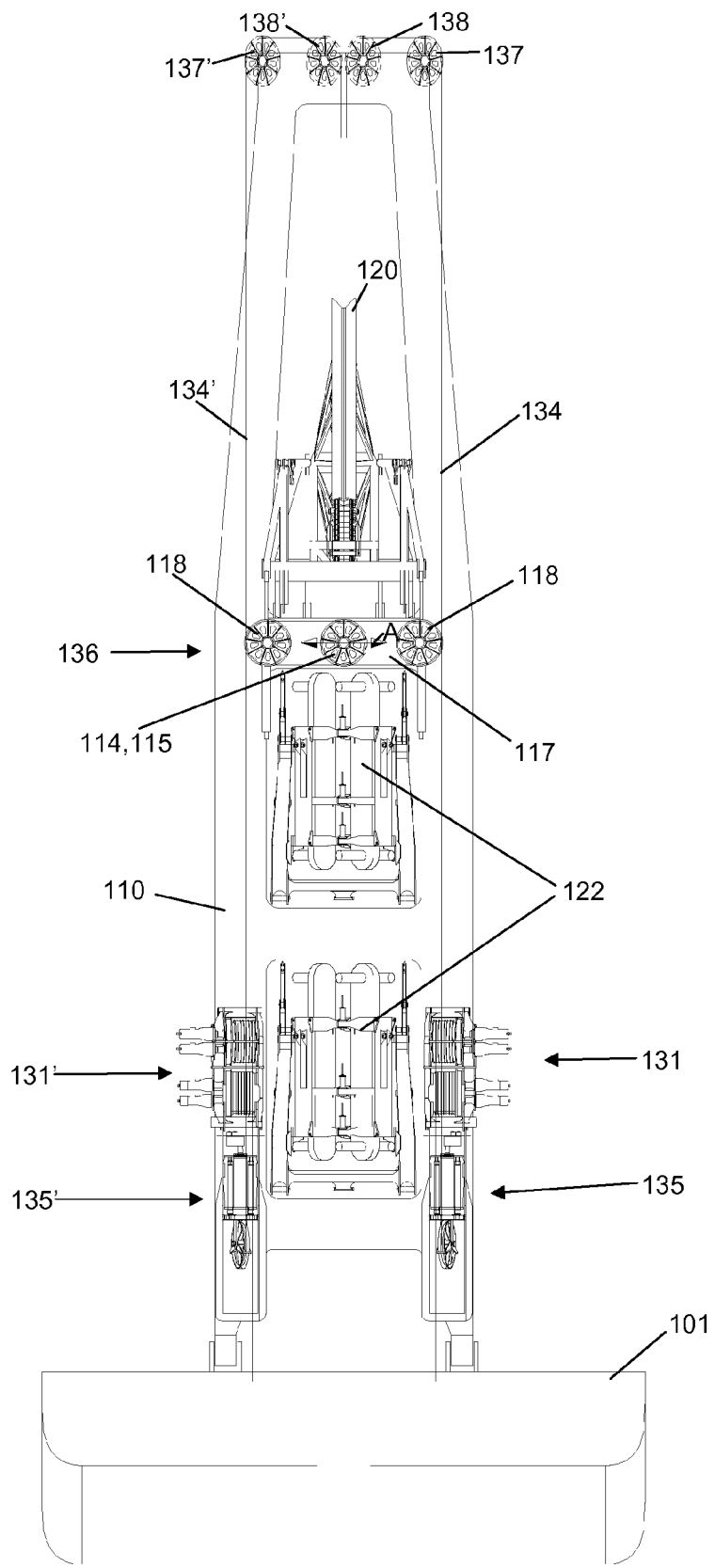
FIG. 7 depicts the vessel of FIG. 6 from the back.

FIG. 7 depicts the vessel of FIG. 6, but now seen from the back of the vessel. Shown in FIG. 7 are the hull 101, the tiltable tower 110, the tensioners 122, and the guide wheel 120, which tensioners and guide wheel can be seen through openings in the tower 110.

Also shown in FIG. 7 are the symmetrically placed first and second traction winch 131, 131', heave compensators 135, 135', and the sheaves 137,138,137',138' for respectively the first cable 134 and the second cable 134'.

Between the heave compensators 135,135' and the sheaves 137,138,137',138', the first tension equalizing mechanism 136 is provided. The first tension equalizing mechanism comprises sheaves 114,115 of which only one sheave can be seen, as the rotation axes of the sheaves are aligned on a common axis. The cables 134, 134' are guided to and from the sheaves 114,115 by sheaves 118 which have been mounted to the tower 110. The sheaves 114 and 115 are interconnected and movable in a direction A relative to a first reference structure 117 mounted to the tower under the effect of differential tensions in the cables 134,134' so as to equalize said tensions.

The embodiment of FIG. 7 is therefore a more practical implementation of the tension equalizing mechanism according to FIG. 2.

Shown at the top of the tower, the sheaves 138,138' are placed close next to each other, so that the cables 134,134' from there on are also close together. This close configuration is advantageous for passing the tensioners, but will increase the chance of entanglement of the cables during lowering and raising of the cables at relatively great depth. However, as the cables 134,134' have minimal movement relative to each other, wear is minimized and the close configuration is made possible.

An advantage of the embodiment according to FIGS. 6 and 7 is that the first and second cable when passing sheaves of e.g. the first tension equalizing mechanism are always bent in the same direction.

Figure 8:
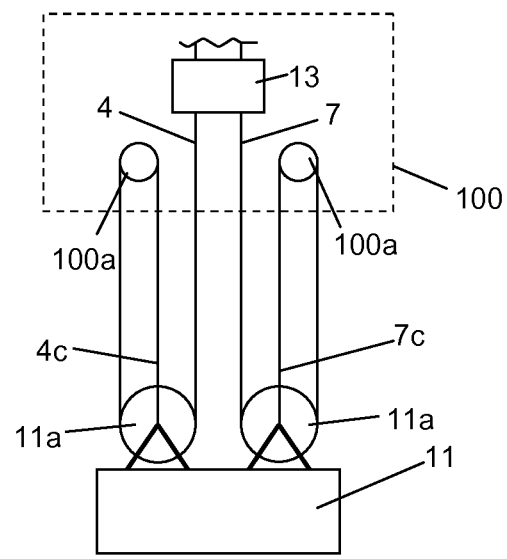
FIG. 8 depicts a schematic view of a part of a marine load raising and lowering system according to an embodiment of the invention.

FIG. 8 depicts a part of a marine load raising and lowering system according to another embodiment of the invention. Schematically shown are a load connector 11, a vessel 100 and a first tension equalizing mechanism. FIG. 8 shows an alternative way of connecting a first cable 4 and a second cable 7 to the load connector 11 and vessel 100 which falls within the scope of the invention.

The first and second cable 4,7 extend from the first tension equalizing mechanism 13 towards the load connector 11. The load connector 11 is provided with respective sheaves 11a directing the first and second cable 4,7 back towards the vessel 100. When reaching the vessel, the first and second cable are directed back towards the load connector by respective sheaves 100a which are mounted to the vessel 100. After reaching the load connector 11, the terminal ends 4c, 7c of the first and second cable are connected to the load connector 11. An advantage of this embodiment is that the load connector is supported by six cable portions in total, so that the thickness of the first and second cable can be reduced or the hoisting capacity of the load connector can be increased.

FIG. 9 depicts a schematic view of a marine load raising and lowering system 31 according to an alternative embodiment of the invention, for use on a vessel, preferably a vessel for laying an offshore pipeline, which system comprises a first winch 32 with first driving means 33 for raising and lowering a first cable 34 from the first winch 32, and a second winch 35 with second driving means 36 with second driving means 36 for raising and lowering a second cable 37 from the second winch 35. The first and second driving means 33, 36 can be synchronized by operating means 38 connected to the first and second driving means so as to perform synchronous raising and lowering of the first and second cable. The operating means are in this embodiment electronic operating means.

The first and second cable 34,37 will in practice be very long, but represented here short for reasons of clarity. The first and second driving means are electronically and/or mechanically connected to the respective first and second winch 32,35. The driving means may include any type of motor.

The first and second cable 34,37 are connected to a load connector 41 with a respective terminal end 34c, 37c of the first and second cable 34,37. The load connector 41 is or can be coupled to a load 42. Due to this configuration, the cable portions 34c, 37c are substantially stationary with respect to each other, so that wear during entanglement of the cables (e.g. in deepwater operations) is minimized.

Between the load connector 41 and the winches 32, 35, a first tension equalizing mechanism 43 is provided through which the first and second cable 34,37 pass. In this embodiment, the first tension equalizing mechanism 43 comprises a sheave 39 guiding the first cable 34 to and from the first winch 32. Similarly, the first tension equalizing mechanism 43 comprises a sheave 40 guiding the second cable 37 to and from the second winch 35. The sheaves 39,40 are both connected to a beam 46 via respective connecting means 46a, 46b. Said connecting means may comprise a cable, rod, or the like. In a possible not shown embodiment, the sheaves of the first tension equalizing mechanism, the sheaves may be interconnected via hydraulic coupling means, such as two interconnected hydraulic cylinders. The beam 46 is pivotable about first reference structure 47, as indicated by arrow D, so that the sheaves 39,40 are movable in respective directions E1 and E2, representing a combined sideward's and up-/downwards movement. Due to this configuration, movement of sheave 40 for instance to an upward direction to the right occurs simultaneously, i.e. synchronously, with movement of sheave 39 in a downward direction to the right, i.e. cable 37 is hauled in and cable 34 is paid out. Movement of the sheaves is caused by differential tensions in the first and second cable 34,37 and will equalize said tensions.

An advantage of the curved movements E1, E2, is that when only one cable is being used in the marine load raising and lowering system, this cable is automatically positioned in line with the first reference structure 47. This first reference structure 47 may be positioned exactly above the load connector, which is advantageous in view of the distribution of forces.

The first tension equalizing mechanism 43 thus comprises interconnected sheaves 39, 40 engaging with the first and second cable respectively, wherein said sheaves 39,40 are movable relative to the first reference structure 47 which is mounted on the vessel. The first tension equalizing mechanism is configured to move the sheaves, 39, 40 under the effect of differential tensions in the first and second cable so as to equalize said tensions. This ensures that the load is suspended by both the first and second cable and no overload in one of the cables occurs due to e.g. non-synchronous lowering or raising of the cables.

One of the advantages of this compact set-up is that the load connector is able to pass smaller openings, e.g. such as openings in tensioners, or moonpools.

Preferably, as is shown, but not necessarily, the sheaves 39,40 are aligned such that their respective rotation axes substantially coincide, i.e. are aligned on a common axis. This provides a compact structure.

If movement of the sheaves 39, 40 is caused by a non-synchronous driving of the first and second winch it is very likely that the sheaves 39,40 will continue to move to one side of the first tension equalizing mechanism to constantly compensate for the non-synchronicity. As movement of the sheaves 39,40 is limited, it is preferred that a displacement sensor in contact with the operating means is provided measuring the displacement of the sheaves 39,40 relative to the first reference structure 47 to correct for non-synchronous raising or lowering of the first and second cable. This displacement sensor can be provided between the first reference structure 47 and the beam 46 to measure a rotation of said beam 46 relative to the first reference structure, or can be provided between the first reference structure and the connecting means 46a, 46b or sheaves to measure a translation of said connecting means or sheaves relative to the first reference structure. It is even possible to provide the displacement sensor between the sheaves 39,40 to measure the relative mutual position of the sheaves 39,40.

An advantage of the configuration of FIG. 9 is that the system may be designed symmetrical about a plane equidistant and parallel to both cable portions 34, 37, said plane also being substantially parallel to the rotation axes of the sheaves 39, 40.

Another advantage is that the configuration of FIG. 9 can easily be integrated with sheaves already provided at the vessel, such as sheaves 137, 138 on top of the tower 110 as visible in FIGS. 6 and 7.

Figure 10B:
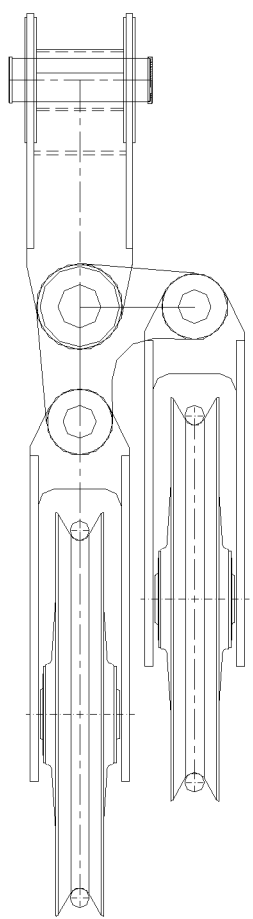

In FIGS. 10a,b a preferred embodiment of a tension equalizing mechanism 60 according to the embodiment of FIG. 9 is shown. In particular, it is visible that a first cable 61 is being guided by sheave 69 and second cable 62 is being guided by sheave 70, guiding the cables to and from respective winches (not shown). The sheaves 69,70 are both connected to a connection member 76 via respective connecting means 76a, 76b. The connection member 76 is pivotable about a first reference structure 77, mounted to the vessel, via pivot axis 77a, as indicated by arrow G, so that the sheaves 69,70 are movable in respective directions H1 and H2, representing a combined sideward's and up-/downwards movement. Due to this configuration, movement of sheave 70 in a right upward direction, as visible in FIG. 10b, occurs simultaneously, i.e. synchronously, with a right downward movement of sheave 69, i.e. cable 62 is hauled in and cable 61 is paid out. Movement of the sheaves is caused by differential tensions in the first and second cable 61,62 and will equalize said tensions.

The invention claimed is:

1. A marine load raising and lowering system for use on a vessel, said system comprising:
   a first winch comprising a first driving mechanism configured to raise or lower a first cable from the first winch;
   a second winch comprising a second driving mechanism configured to raise or lower a second cable from the second winch;
   an operating mechanism connected to the first and second driving mechanisms of respectively the first and second winches and configured to synchronize the first and second driving mechanisms so as to perform synchronous raising or lowering of the first and second cable; and
   a load connector, configured to couple a load directly thereto,
   wherein the first and second cable are respectively connected to the load connector with a respective terminal end,
   wherein the system further comprises a first tension equalizing mechanism adapted to equalize the tension in the first and second cables, said first tension equalizing mechanism having a first cable-engaging member engaging with the first cable, and a second cable-engaging member engaging with the second cable wherein the first cable-engaging member and the second cable-engaging member are interconnected with each other while the first cable and the second cable are not interconnected with each other via the first tension equalizing mechanism, and the first cable-engaging member and the second cable-engaging member are moveable relative to a first reference structure to be mounted on the vessel, and
   wherein said first tension equalizing mechanism is configured to move the first and second cable-engaging members under the effect of a difference in tension in the first and second cable so as to equalize said tensions.

2. The system according to claim 1, wherein the first cable-engaging member is a first sheave and the second cable-engaging member is a second sheave.

3. The system according to claim 2, wherein the first and the second sheave are arranged such that their rotation axes are aligned on a common axis.

4. The system according to claim 2, further comprising sheaves upstream and downstream of the first tension equalizing mechanism to guide the first and second cable from and to the first and second cable-engaging members.

5. The system according to claim 2, further comprising a heave compensator configured to pay out or haul in the first and second cables to compensate for undesired vessel motions.

6. The system according to claim 1, further comprising sheaves upstream and downstream of the first tension equalizing mechanism to guide the first and second cable from and to the first and second cable-engaging members.

7. The system according to claim 1, further comprising a heave compensator configured to pay out or haul in the first and second cables to compensate for undesired vessel motions.

8. The system according to claim 1, wherein each of the first and second winches is a traction winch cooperating with a respective storage winch driven by an associated operating mechanism configured to provide a hold-back force in the first and second cable for the respective traction winch.

9. The system according to claim 8, wherein a hold-back force sensor is provided in contact with the operating mechanism of the storage winches in order to synchronize movement of the storage winches with the respective first and second winches.

10. The system according to claim 1, wherein a displacement sensor in contact with the operating mechanism is provided measuring the displacement of the first and second cable-engaging members to correct for non-synchronous raising or lowering of the first and second cable.

11. The system according to claim 1, wherein the first and second cable-engaging members are interconnected using a connecting cable.

12. The system according to claim 11, wherein the first reference structure is a sheave, and the connecting cable is running over said sheave.

13. The system according to claim 1, further comprising:
   a third winch comprising a third driving mechanism configured to raise or lower a third cable from the third winch;
   a fourth winch comprising a fourth driving mechanism configured to raise or lower a fourth cable from the fourth winch; and
   a second tension equalizing mechanism having interconnected a third and fourth cable-engaging members to engage with the third and fourth cable, respectively
   wherein the third and fourth cable-engaging members are moveable relative to a second reference structure to be mounted on the vessel,
   wherein the second tension equalizing system is configured to move the third and fourth cable-engaging members under the effect of a difference in tension in the third and fourth cable so as to equalize said tensions,
   wherein the third and fourth cable are each connected to the load connector with a respective terminal end of the third and fourth cable, and
   wherein the first and second reference structures of the first and second tension equalizing mechanisms are interconnected, said first and second reference structures being moveable relative to a third reference structure to be mounted on the vessel so as to equalize the tensions in the first, second, third and fourth cable.

14. The system according to claim 13, wherein the first and second reference structures are interconnected using a connecting cable.

15. The system according to claim 1, wherein the load raising and lowering system operates as an abandonment and recovery system.

16. The system according to claim 1, wherein the first tension equalizing mechanism, in its entirety, is positioned between the operating mechanism and the load connector.

17. A method for lowering a load from a vessel into the water, wherein use is made of a marine load raising and lowering system comprising first and second winches with respective first and second driving mechanisms configured to raise or lower first and second cables from the winches, an operating mechanism connected to the first and second driving mechanisms of the first and second winches for synchronising the first and second driving mechanisms so as to perform synchronous raising or lowering of the cables, and a first tension equalizing mechanism for equalizing tensions in the first and second cable, said first tension equalizing mechanism having a first cable-engaging member engaging with the first cable, and a second cable-engaging member engaging with the second cable, wherein the first cable-engaging member and the second cable-engaging member are interconnected with each other while the first cable and the second cable are not interconnected with each other via the first tension equalizing mechanism, and the first cable-engaging member and the second cable-engaging member are moveable relative to a first reference structure to be mounted on the vessel, and wherein the first tension equalizing mechanism is configured to move the first and second cable-engaging members under the effect of a difference in tension in the first and second cable so as to equalize said tensions, said method comprising the steps of:
- connecting a respective terminal end of the cables to a load connector;
- connecting a load directly to the load connector; and
- lowering the cables.

18. The method according to claim 17, further comprising the steps of:
- measuring a displacement of the first and second cable-engaging members; and
- adjusting signals provided to the first and second driving mechanisms by the operating mechanism based on said measured displacement of the first and second cable-engaging members to correct for non-synchronous lowering of the cables.

19. The method according to claim 17, wherein the signals provided to the first and second driving mechanisms by the operating mechanism are adjusted such that the displacement of the first and second cable-engaging members is limited to a predetermined displacement range.

20. The method according to claim 17, wherein the first tension equalizing mechanism, in its entirety, is disposed between the operating mechanism and the load connector.

* * * * *